United States Patent [19]

Rickert

[11] 3,836,263

[45] Sept. 17, 1974

[54] IMPROVED REFLEX SIGHT HAVING A FREQUENCY SELECTIVE COLLIMATING BEAM COMBINING MIRROR

[76] Inventor: Glenn E. Rickert, Community State Bank, Huntington, Ind. 46750

[22] Filed: Nov. 19, 1969

[21] Appl. No.: 878,021

[52] U.S. Cl. .................................. 356/251, 350/276
[51] Int. Cl. ............................................. G02b 23/10
[58] Field of Search ...... 356/247, 251; 350/10, 276; 33/50

[56] References Cited
UNITED STATES PATENTS

| 683,203 | 9/1901 | Grubb | 356/251 |
|---|---|---|---|
| 2,437,744 | 3/1948 | Horvath | 350/10 |
| 2,633,051 | 3/1953 | Davis | 356/251 |
| 2,780,130 | 2/1957 | Mauer | 356/251 |

FOREIGN PATENTS OR APPLICATIONS 22,127  12/1900  Great Britain

*Primary Examiner*—Ronald L. Wibert
*Attorney, Agent, or Firm*—Albert L. Jeffers; Roger M. Rickert

[57] ABSTRACT

A gunsight is disclosed which provides a collimated image of a reticle, which reticle is lighted by ambient light. This image and the view of a target are combined by a frequency selective beam combining device such as a dichroic mirror. The frequency selective combination causes the reticle to appear to an observer in a color which contrasts with the target. Collimation and the frequency selective combination are simultaneously achieved using a dichroic concave mirror having either a spherical or a parabolic curvature.

5 Claims, 5 Drawing Figures

IMPROVED REFLEX SIGHT HAVING A FREQUENCY SELECTIVE COLLIMATING BEAM COMBINING MIRROR

BACKGROUND OF THE INVENTION

This application is related to and utilizes some of the concepts disclosed in my copending application of Ser. No. 732,234, entitled "REFLEX SIGHT," filed May 27, 1968 and now abandoned. This invention relates to a collimated aiming device and more particularly to a collimated beam combining gunsight, also known as a reflex gunsight.

Reflex sights have been known for a number of years and their general construction usually consists of a semi-transparent mirror surface through which a target is viewed and reflected from which a reticle image is viewed. A collimator is typically employed to cause the reticle image to appear in focus with and parallax free with a target. The collimator may be a refracting lens in the system or the semi-transparent mirror may be concave instead of flat so that it collimates the reticle image at the same time it reflects that image.

The reflex sight disclosed in the aforementioned application Ser. No. 732,234 represents a substantial improvement over prior art reflex sights, however, it does have the disadvantage of being a rather complex structure.

Accordingly, it is one object of the present invention to provide a sighting device having the advantages of the sighting device disclosed in said Ser. No. 732,234 but having fewer parts, greater simplicity, increased compactness, and an improved economy in manufacture.

The sighting device disclosed in Ser. No. 732,234 overcomes numerous prior art deficiencies by providing a frequency selective semi-transparent mirror which passes a very high percentage of most of the visible spectrum emanating from a target while, at the same time, reflecting a very high percentage of a portion of the spectrum to provide an image of the reticle indicia having predominantly the color of the highly reflected portion of the spectrum. The aforementioned application also provides for a reflex sight the reticle of which is lighted by light emanating from the general area of the target and thus, when bright objects are being viewed with the sight the reticle is bright while when a relatively dimly lighted target is being viewed the reticle brightness is correspondingly diminished.

Accordingly, it is an object of the present invention to provide a simplified reflex sight having a reticle brightness which is directly proportional to the brightness of the object being viewed.

It is another object of the present invention to provide a highly accurate sight which may be used in all types of adverse lighting conditions.

A still further object of the present invention is to provide a simplifiex reflex sight having an auxiliary light source for night use.

A salient object of the present invention is to provide a simplified reflex sight having a collimated image of a reticle wherein the reticle image is made to contrast with the target being sighted, by the use of a frequency selective beam combining device.

A further object of the present invention is to provide a reflex sight, the reticle of which may be selectively lighted by down range light or by an auxiliary light source.

A yet further object of the present invention is to provide a reflex sight characterized by its simplicity of construction.

Another object of the present invention is to provide a reflex sight which eliminates the possibility of light being reflected down range and thus disclosing the presence and position of the sight.

These and other objects and advantages of the present invention will appear more clearly from the following detailed description of a preferred embodiment of the invention wherein:

DESCRIPTION OF THE PREFERRED EMBODIMENT

Figure 1:
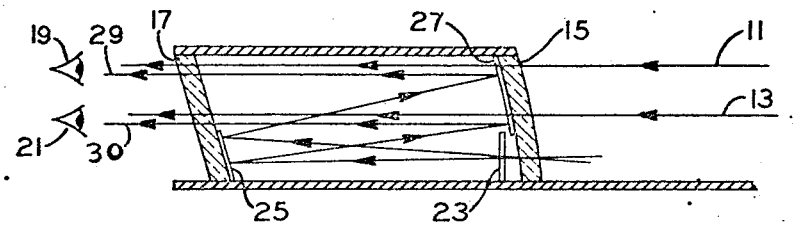
FIG. 1 is a cross sectional view of one form of the present invention.

Referring first to FIG. 1 which shows a cross sectional view of a simplified form of the present invention, assume that light is coming from a distant target along the rays 11 and 13. These rays pass through a front window 15, through a rear window 17, and are viewed by an observer at either 19 or 21. Light emanating from this general target area is also incident upon and passes through the lower portion of this window 15 and strikes the light conducting reticle indicia 23. The reticle indicia 23 consists of light transmitting lines or other indicia on an otherwise opaque background. The light passing through those light transmitting lines is incident upon and reflecting off of fully relfective surface 25 which may be a first surface mirror, and is then again reflected off of coating 27 on the rear side of the top portion of the front window 15. This doubly reflected light then passes out the rear window 17 to an observer at either 19 or 21. The window 15 and thus the coating 27 is a portion of a spherical or parabolic curve having a focal length equal to the sum of the distances between the reticle 23 and the reflective surface 25, and the reflective surface 25 and the focusing surface 27. Thus, light passing through the reticle indicia 23 is collimated by the reflective surface 27 and appears to an observer to be in focus with and parallax free with the distant target.

The coating 27 is a partially reflecting and partially transmitting (semi-transparent mirror) coating thus allowing the superimposition of rays 11 and 29 or rays 13 and 30 depending upon whether the observer is located at 19 or 21. The parallax free aspect of the present invention may be most readily understood if we assume that the target being sighted is at an infinite distance from the observer and thus that the rays 11 and 13 are parallel and emanating from a point on the target.

Under these conditions, the focal length of the collimating reflector 27 is equal to the sum of the distances from the collimating reflector 27 to the plane reflective surface 25 plus the distance from the plane surface 25 to the reticle indicia 23. Thus, an observer located at 19 sees the ray 11 emanating from the point on the target superimposed with the ray 29 which defines the center of the reticle indicia, but if this observer moves to location 21, he sees the ray 13 also emanating from the infinitely distant point superimposed on the ray 30 which again describes the center of the reticle indicia. Thus, the sight is parallax free for a target located in an infinite distance and by shortening very slightly one of the distances either between the reticle and the reflective surface 25 or between the reflective surface 25 and the collimating reflective surface 27 this same effect may be achieved for targets which are at a finite but relatively distant location.

The partially reflective coating 27 is a semitransparent frequency selective reflector or mirror having a high reflection and a low transmission for one portion of the visible spectrum and a high transmission and low reflection for another portion of the visible spectrum. Such frequency selective beam splitter mirrors are typically of the multiple layer interference coating type. A so called dichroic mirror can be employed for this purpose. The spectral properties of such a reflector suitable for use in the present invention is disclosed in detail in the aforementioned Ser. No. 732,234 and functions in general to pass, for example, 80 percent of the light emanating from the target area in the blue, green and yellow portions of the spectrum while passing only 10–20 percent of the light in the red area of the spectrum. The surface then would reflect, say, 80–90 percent of the red and orange light passing through the reticle indicia and reflected off of the fully reflective surface 25 while reflecting a small percentage of the blue, green and yellow light from said reticle marks. This coating 27 then is effective to cause a color separation whereby the reticle marks appear in a color which contrasts with the background or general target area. When using the sight an observer will see his target with the red portion of its spectrum suppressed while at the same time, he will see a reflected view of the reticle with everything but the red portion of the spectrum suppressed. The exact cut off of reflection-transmission is variable by slight changes in coatings for a particular need. The portion of the spectrum chosen for reflection (or transmission) can be at either end of the spectrum or can be more centrally located with the remainder of the spectrum on each side of the chosen portion being transmitted (or reflected).

Although considerably less efficient than the preceeding described effect, the color separation may be achieved by using a first filter to suppress one portion of the spectrum for the reticle light and using a second filter to suppress another portion of the spectrum of the light from the target.

Figure 2:
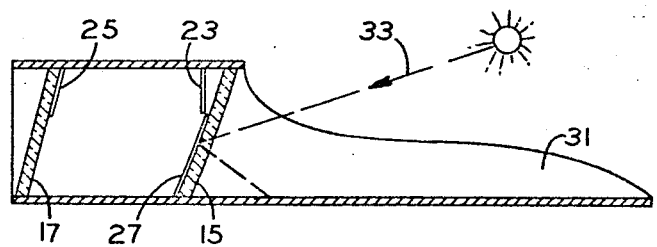
FIG. 2 is a cross sectional view of an alternative form of the present invention showing a forwardly projecting portion for eliminating down range reflections.

Turning now to FIG. 2, where elements similar to those already discussed with respect to FIG. 1 are identified by like reference numerals, the sight of the present invention is shown in an inverted orientation with the fully reflective surface 25 near the top of the sight and with light passing through the window 15 near the top being incident upon the reticle indicia 23. The light which passes through the indicia is reflected by the surface 25 downward toward the dichroic coating 27 and reflected from this coating through the rear window 17 to an observer. Similarly, the target is viewed directly through the lower portions of the windows 17 and 15. The significant aspect of the inverted embodiment shown in FIG. 2 is the forwardly protruding or projecting portion 31 which serves to prevent sun light as represented by the ray 33 as well as other sources of light from being reflected off of the front window and giving away the location of the sighting device. It should be apparent that the sight as shown in FIG. 1 would be susceptible to this defect which is a rather substantial defect if the sight is to be used, for example, in a military environment. The dichroic coating 27 has peculiar reflection characteristics from the back side which may, for example, cause the coating to appear as an extremely bright orange, gold, or other colored spot to a down range observer, but by inverting the sight as shown in FIG. 2 and providing the nose or protruding portion 31 to shield such reflections this defect is overcome. The interior surface of the protruding portion 31 is preferably a dark and nonreflective surface.

Figure 3:
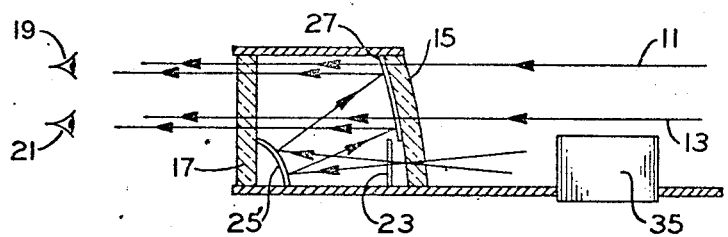
FIG. 3 is a cross sectional view of yet another form of the present invention illustrating one means of compensating for spherical aberration.

Turning now to FIG. 3, a foreshortened embodiment of the sight is shown with an auxiliary light source in place. In the sight of FIG. 1, the focal length of the curved reflective surface 27 is of sufficient length that no parallax is detectable when employing a spherical surface, however, on shorter focal length curves such as that shown in FIG. 3, a spherical curved reflector introduces some spherical aberration and thus some parallax into the system and it is desirable to eliminate this either by using a parabolic or other spherical aberration corrected curve surface for surface 27, or by contouring the fully reflective surface 25' as shown in FIG. 3. In actual working models, this parallax is sufficient as to be undesirable when the distance between front and rear windows is in terms of 1 to 1½ inches. FIG. 3 also illustrates an auxiliary light source 35 which may be used for night sighting on any of the embodiments of this invention. The auxiliary light source may be a standard battery and blub arrangement, an atomically energized light source or any other source of light to illuminate the reticle indicia. Elimination of down range or enemy observation of the artificially lighted reticle at night can be achieved by substantially eliminating from the reticle light those colors which are readily transmitted by the semi-transparent mirror 27.

It should be apparent at this juncture that the invention as thus far disclosed may yet suffer from one defect. As discussed earlier, sights having relatively short focal lengths, that is, a sight of 1 to 1½ inches in length may suffer from sufficient spherical aberration to introduce a detectable amount of parallax in the system. On the other hand, if the distance between the front and rear windows is sufficient to eliminate the parallax problem the front window is in a relatively vertical position and requires a rather lengthy protruding portion 31 in order to eliminate the possibility of detection of light reflected off of that front window. The present invention contemplates yet another embodiment which may be constructed so as to have a focal length which does not introduce any detectable parallax while at the same time does not require a relatively long protruding portion to eliminate reflections that might disclose the position of the sight user.

Figure 5:
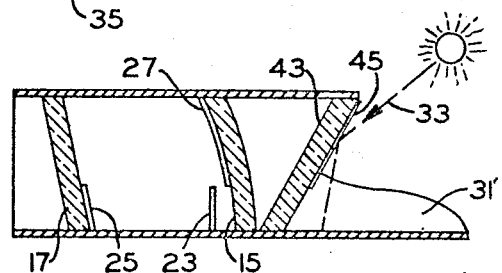
FIG. 5 is a cross sectional view of a second alternative form of the present invention illustrating another scheme for preventing down range reflections of light.

FIG. 5 illustrates this improved variation which contains all of the elements of the FIG. 1 embodiment identified by like numerals as well as a short protruding portion 31' and an additional window 43 having a frequency selective coating 45 similar to the coating 27. In this embodiment, the separation between the two windows 15 and 17 might for example be, say, over 2 inches so that no troublesome parallax problems are introduced in the system. With a reflective surface 27 of this relatively long focal length, the protruding portion 31 required to eliminate the possibility of reflections of light being detected is necessarily quite long and does not readily yield a compact sighting device. To overcome this problem, the second window 43 having a frequency selective coating 45 similar to the coating 27 has been introduced. The window 43 is a plane or nonfocusing surface and light incident upon that window and its reflective coating 45 behaves much as the earlier discussed surface 27, that is, it reflects an orange or gold colored spot due to, for example, incident sunlight as represented by the ray 33. However, the plane surface is inclined at a sufficiently great angle so that this reflected sunlight is directed down toward and absorbed by the protruding portion 31'. Light which passes through the reflective coating 45 has a portion of its spectrum suppressed and therefore very little light is reflected back off of the surface 27 because those frequencies which would normally be reflected from the surface 27 have already been suppressed and reflected downward by the surface 45. The very small percentage of light which is reflected back from the surface 27 again is in the frequency range to be reflected off of the surface 45 toward the top of the sight enclosure and thus does not pass back through the window 43 so as to disclose the location of the sighting device to an enemy.

In all other respects the sight of FIG. 5 functions essentially the same as the sights of FIGS. 1 and 2, however, it should be observed that the reflective surface 45 does not extend along the full length of the window 43 but rather terminates so as to not attenuate the light coming into and passing through the reticle 23 because the present system relies heavily on frequencies of light being present in the light passing through the reticle 23 which are not present in the light passing through the surfaces 45 and 27. This same effect could be achieved by making the surface 45 any other type of filter which serves to pass the same portions of the spectrum as passed by the reflective surface 27 and which filter 45 would also filter out those portions of the spectrum reflected off of the reflective surface 27.

Figure 4:
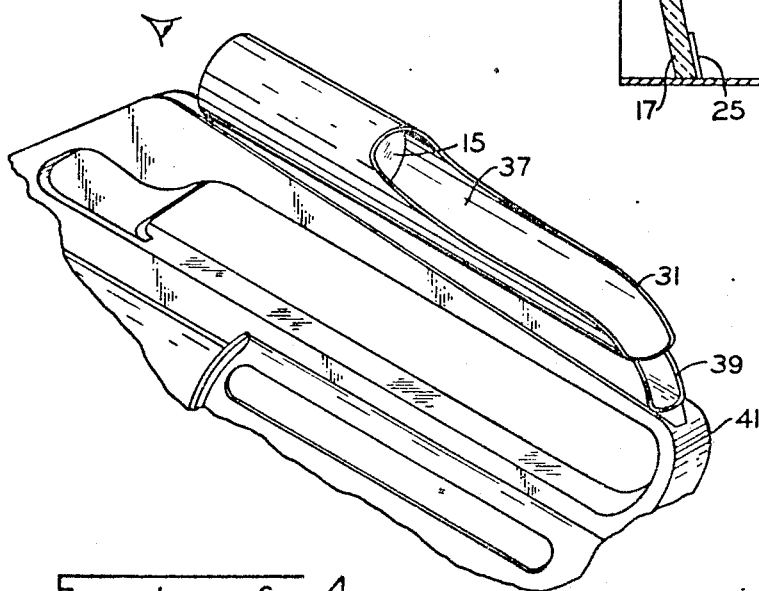
FIG. 4 is a perspective view of the sight of FIG. 2 shown in place on the receiver of a rifle.

FIG. 4 shows the sight of FIG. 2 in place on the receiver of a rifle and illustrates one preferred contour for the forwardly projecting portion 31. The forwardly projecting portion 31 is a reflection shield and has a nonreflective interior surface 37 which prevents reflections from sun light and other light sources reflecting down range and disclosing the location of the sighting device. In this particular embodiment, the front window 15 as well as the other optical elements of the device are mounted in a simple circular tube and the front portion of the tube is cut away so as to not restrict the view through the tube and yet at the same time provide the nonreflective surface 37. The tube is in turn mounted on a mounting means 39 and that mounting means is secured to the receiver 41 of a rifle.

While the present invention has been disclosed with respect to specific embodiments, these embodiments are for illustrative purposes only and many modifications and variations are possible and will become apparent to those of ordinary skill in the art in view of the foregoing description and the scope of the present invention is to be limited only by that of the appended claims.

I claim:
1. An improved reflex sight having an enclosing member, a front window, and a rear window and comprising in combination:
light conducting reticle indicia adapted to be directly illuminated by incident light;
frequency selective beam combining collimating means comprising a portion of said front window and adapted to simultaneously provide a collimated image of said reticle indicia and an uncollimated view of a target;
reflective means comprising a portion of said rear window and so positioned with respect to said frequency selective beam combining collimating means as to allow said incident light to be light emanating from the general area of said target; and
frequency selective light passing means positioned in front of said front window and adapted to substantially eliminate any down range reflections of light off of said front window.
2. The method of sighting comprising:
illuminating the light transmitting indicia of a reticle by the use of incident down range light so that the light passing through the indicia constitutes a substantial portion of the visible spectrum;
deviating the light passing through said indicia;
simultaneously collimating the light passing through the indicia so as to produce a collimated image of the indicia, and selecting a predetermined portion of the spectrum of the light passing through the reticle indicia so that the collimated image comprises only a portion of the visible spectrum; and
preventing unwanted down range reflections, said step of preventing comprising the steps of providing an absorbtive protruding portion and a frequency selective light passing means whereby light reflected from said frequency selective means is absorbed by said projecting portion.
3. An enclosed reflex sight for providing a reticle indicia image the brightness of which varies directly with target brightness and having an enclosing member which supports a front window and a rear window and comprising:
light conducting reticle indicia adapted to be directly illuminated by incident light passing through a first portion of said front window from the general area of the target;
means associated with said rear window for deviating the light passing through said indicia to direct said light back toward a second portion of said front window;
frequency selective beam combining collimating means associated with said second portion of said front window and adapted to simultaneously provide a collimated image of said reticle indicia predominantly of a first portion of the target area light spectrum and an uncollimated view of the target predominantly of a second portion of the target area light spectrum; and
a forwardly protruding portion associated with said enclosing member and provided with a light absorbing low reflectance surface which is oriented with respect to said frequency selective beam combining collimating means so as to prevent light being reflected toward said target.

4. An enclosed reflex sight for providing a reticle indicia image the brightness of which varies directly with target brightness and having an enclosing member which supports a front window and a rear window and comprising:

light conducting reticle indicia adapted to be directly illuminated by incident light passing through a first portion of said front window from the general area of the target;

means associated with said rear window for deviating the light passing through said indicia to direct said light back toward a second portion of said front window;

frequency selective beam combining collimating means associated with said second portion of said front window and adapted to simultaneously provide a collimated image of said reticle indicia predominantly of a first portion of the target area light spectrum and an uncollimated view of the target predominantly of a second portion of the target area light spectrum; and a reflection suppressing window supported by said enclosing member and having an interference coating thereon, said reflection suppressing window being aligned with said front and rear windows and inclined with respect to a line of sight through said front and rear windows so as to prevent reflection in the direction of said line of sight toward the target.

5. An enclosed reflex sight for providing a reticle indicia image the brightness of which varies with the brightness of a target being viewed comprising:

light transmitting reticle indicia on an otherwise opaque background adapted to pass incident light from the target area;

frequency selective beam combining means adapted to superimpose a collimated image of said reticle indicia predominantly of a first portion of the target area light spectrum and an uncollimated view of the target predominantly of a second portion of the target area light spectrum; and means provided with a light absorbing low reflectance surface and extending from said frequency selective beam combining means in the general directional of the line of sight to the target a distance sufficient that any line normal to said beam combining means will intersect said surface so as to prevent incident light being reflected toward the target by said frequency selective beam combining means.

* * * * *